May 4, 1926.

H. E. MAYNARD 1,583,000

MEANS FOR SECURING TUBING TO A SUPPORT

Filed August 17, 1925

Inventor
Howard E. Maynard
By Hing Harness
Attorney

Patented May 4, 1926.

1,583,000

UNITED STATES PATENT OFFICE.

HOWARD E. MAYNARD, OF DETROIT, MICHIGAN, ASSIGNOR TO CHRYSLER CORPORATION, OF DETROIT, MICHIGAN, A CORPORATION OF DELAWARE.

MEANS FOR SECURING TUBING TO A SUPPORT.

Application filed August 17, 1925. Serial No. 50,885.

*To all whom it may concern:*

Be it known that I, HOWARD E. MAYNARD, a citizen of the United States, and resident of the city of Detroit, in the county of Wayne and State of Michigan, have invented certain new and useful Improvements in Means for Securing Tubing to a Support, of which the following is a specification.

My invention relates to a construction for rigidly securing tubing to a support and has particular utility in securing tubing such as is used for hydraulic braking apparatus to the frame of an automobile. It is well known in the construction of hydraulic braking apparatus that tubing for the passage of fluid must be used, and that such tubing must be in some way secured to the automobile in a rigid manner to prevent its dislocation during the driving and consequent vibration of the automobile, owing to the inequalities of the road.

It is therefore the primary object of my invention to provide a cheap and efficient construction for accomplishing this purpose.

With the above and other objects in view, my invention consists in the arrangement, combination and construction of the various parts of my improved device, as well as the methods utilized therewith, as set forth in the specification, claimed in my claims, and shown in the accompanying drawings, in which:

Figure 1:
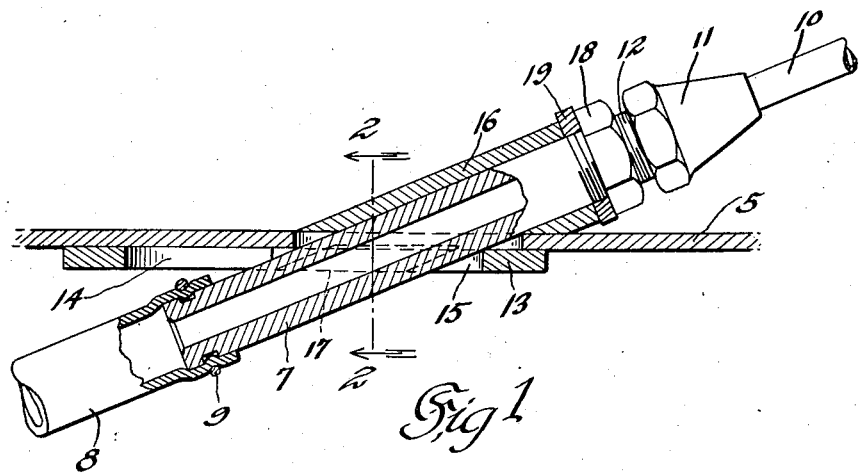
Fig. 1 is a sectional view of an automobile frame showing partly in section and partly in elevation, tubing extending therethrough, as well as the means for securing such tubing in place.
Figure 3:
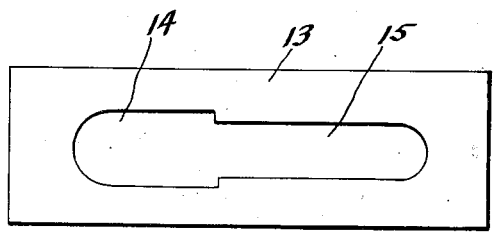
Fig. 3 is a detailed view of a plate utilized in connection with my invention.
Figure 2:
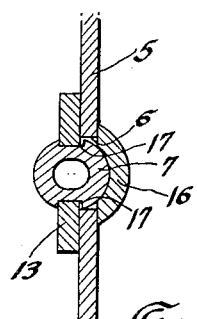
Fig. 2 is a sectional view taken on line 2—2 of Fig. 1.

I have shown an automobile frame 5 having an opening 6 therein, through which a piece of tubing 7 extends. The tubing 7 has a rubber or other flexible hose 8 suitably secured on one end thereof as by means of a ring 9, and a piece of tubing 10 secured on the other end thereof by a fitting 11 secured on the threads 12.

A plate 13 is positioned against one side of the frame 5 and has a keyhole slot therein consisting of the enlarged portion 14 and the smaller portion 15.

On the other side of the frame 5 a sleeve 16, enclosing a portion of the tubing 7 is provided, that portion of the sleeve adjacent the frame being cut diagonally.

The tubing 7 is extended diagonally through the opening 6 in the frame 7 and through the enlarged portion 14 of the keyhole slot in the plate 13. The plate 13 is then pushed along the face of the frame 5 until the smaller portion 15 of the keyhole slot engages in the grooves 17 in the tubing 7. The sleeve 16 is then pushed along the tubing 7 until the diagonally cut end thereof bears against the side of the frame 5, at which time the nut 18 on the screw threads 12 is screwed home against a lock washer 19 to secure the sleeve rigidly in place.

In this manner the tubing 7 will be rigidly attached to the frame 5 so that it cannot move with respect to the frame as the frame is vibrated in operation.

It will be obvious that various changes may be made in the arrangement, combination and construction of the various parts of my improved device, without departing from the spirit of my invention and it is my intention to cover by my claims such changes as may be reasonably included within the scope thereof.

What I claim is:

1. In combination, a supporting member having an opening therein, tubing extended through said opening, a plate on one side of said opening having a slot therein larger at one end than at the other, grooves in the tubing, whereby said tubing may be passed through said large portion of the slot and moved into the small portion thereof with said grooves engaging the sides of said small portion, and means for securing said tubing on the other side of said opening to prevent fore and aft movement of the tubing.

2. In combination, a supporting member having an opening therein, tubing extended through said opening, a plate on one side of said opening having a slot therein larger at one end than at the other, grooves in the tubing, whereby said tubing may be passed through said large portion of the slot and moved into the small portion thereof with said grooves engaging the sides of said small portion, and means for securing said tubing on the other side of said opening to prevent fore and aft movement of the tubing, said means consisting of a flange like portion on the tube adapted to bear against said support.

3. In combination, a supporting member having an opening therein, tubing extended through said opening, a plate on one side of said opening having a slot therein larger at one end than at the other, grooves in the tubing, whereby said tubing may be passed through said large portion of the slot and moved into the small portion thereof with said grooves engaging the sides of said small portion, and means for securing said tubing on the other side of said opening to prevent fore and aft movement of the tubing, said means consisting of a sleeve on said tubing whose one end is adapted to bear against said support and a nut threaded on said tubing adapted to be screwed against the other end of said tube to force first end against said support.

4. In combination, a support having an opening therein, a tube diagonally extended through said opening, diagonal grooves in said tubing, a plate adapted to bear against one side of said support and having a slot therein larger at one end than at the other, whereby said tubing may be disposed in said larger portion and said plate moved to engage said grooves and said smaller portion, a sleeve on said tubing on the opposite side of said support, having one end diagonally cut to bear against said support, a nut threaded on said tubing beyond the other end of said sleeve and adapted to be screwed down to securely lock said sleeve against said support.

HOWARD E. MAYNARD.